(12) United States Patent
Volny et al.

(10) Patent No.: US 11,027,851 B2
(45) Date of Patent: Jun. 8, 2021

(54) HEAD RESTRAINT FOR PARACHUTE ASSEMBLIES

(71) Applicant: GOODRICH CORPORATION, Charlotte, NC (US)

(72) Inventors: Jaro S. Volny, Scottsdale, AZ (US); Kassidy L. Carson, Colorado Springs, CO (US); Scott R. Patterson, Manitou Springs, CO (US)

(73) Assignee: Goodrich Corporation, Charlotte, NC (US)

(*) Notice: Subject to any disclaimer, the term of this patent is extended or adjusted under 35 U.S.C. 154(b) by 336 days.

(21) Appl. No.: 16/138,014

(22) Filed: Sep. 21, 2018

(65) Prior Publication Data
US 2020/0094972 A1 Mar. 26, 2020

(51) Int. Cl.
B64D 17/24 (2006.01)
B64D 17/30 (2006.01)
B64D 25/10 (2006.01)

(52) U.S. Cl.
CPC ............. B64D 17/24 (2013.01); B64D 17/30 (2013.01); *B64D 25/10* (2013.01)

(58) Field of Classification Search
CPC ......... B64D 17/24; B64D 17/30; B64D 25/10
See application file for complete search history.

(56) References Cited

U.S. PATENT DOCUMENTS

| | | | |
|---|---|---|---|
| 1,640,270 A | 8/1927 | Furman | |
| 2,708,083 A * | 5/1955 | Martin | B64D 25/10 244/122 AE |
| 3,372,893 A | 3/1968 | Larsen | |
| 3,498,565 A | 3/1970 | Nash-Boulden Stephens | |
| 3,768,761 A | 10/1973 | Cramer | |
| 3,841,590 A | 10/1974 | Valentine | |
| 3,921,944 A | 11/1975 | Morrison | |
| 4,399,969 A | 8/1983 | Gargano | |
| 4,466,662 A * | 8/1984 | McDonald | A47C 7/38 297/406 |
| 4,637,577 A | 1/1987 | Miseyko | |

(Continued)

FOREIGN PATENT DOCUMENTS

| | | |
|---|---|---|
| DE | 4334743 | 10/1994 |
| FR | 2750395 | 10/1998 |

(Continued)

OTHER PUBLICATIONS

USPTO, Pre-Interview First Office Action dated Sep. 14, 2020 in U.S. Appl. No. 16/138,415.

(Continued)

*Primary Examiner* — Joseph W Sanderson
(74) *Attorney, Agent, or Firm* — Snell & Wilmer L.L.P.

(57) ABSTRACT

A parachute assembly for decelerating an occupant of an ejection seat may comprise a left shoulder riser configured to be located over a left shoulder of the occupant upon deployment of the parachute assembly. A right shoulder riser may be configured to be located over a right shoulder of the occupant upon deployment of the parachute assembly. A head restraint, configured to be behind a head of the occupant upon deployment of the parachute assembly, may be located between the left and right shoulder risers.

12 Claims, 5 Drawing Sheets

(56) References Cited

U.S. PATENT DOCUMENTS

| | | | | |
|---|---|---|---|---|
| 4,687,160 A | * | 8/1987 | Logemann | B64D 17/24 244/142 |
| 4,850,554 A | * | 7/1989 | Strong | B64D 17/30 244/151 R |
| 4,923,147 A | | 5/1990 | Adams et al. | |
| 5,039,035 A | | 8/1991 | Fitzpatrick | |
| 5,301,903 A | | 4/1994 | Aronne | |
| 6,708,927 B2 | | 3/2004 | Chen | |
| 7,703,152 B2 | | 4/2010 | Rhodes et al. | |
| 9,038,948 B2 | | 5/2015 | Ruff et al. | |
| 9,924,755 B2 | | 3/2018 | Margetis | |
| 2004/0182644 A1 | * | 9/2004 | Kotarski | A61G 1/044 182/3 |
| 2012/0012421 A1 | * | 1/2012 | Morgan | A62B 35/0018 182/3 |
| 2013/0092796 A1 | | 4/2013 | Weinel | |
| 2017/0106987 A1 | | 4/2017 | Adams et al. | |
| 2017/0349292 A1 | | 12/2017 | Adams et al. | |
| 2020/0094972 A1 | | 3/2020 | Volney et al. | |
| 2020/0094973 A1 | * | 3/2020 | Volny | B64D 25/10 |
| 2020/0094974 A1 | * | 3/2020 | Volny | B64D 17/24 |
| 2020/0094975 A1 | * | 3/2020 | Volny | B64D 25/02 |

FOREIGN PATENT DOCUMENTS

| | | |
|---|---|---|
| RU | 2621133 | 5/2017 |
| RU | 2624122 | 6/2017 |

OTHER PUBLICATIONS

USPTO, Pre-Interview First Office Action dated Dec. 22, 2020 in U.S. Appl. No. 16/138,216.

USPTO, Pre-Interview First Office Action dated Dec. 21, 2020 in U.S. Appl. No. 16/138,336.

USPTO, Notice of Allowance dated Nov. 12, 2020 in U.S. Appl. No. 16/138,415.

* cited by examiner

HEAD RESTRAINT FOR PARACHUTE ASSEMBLIES

FIELD

The present disclosure relates to parachutes, and more specifically, to parachute assemblies having a head restraint.

BACKGROUND

Ejection seats are designed to eject pilots from an aircraft, with the pilot oriented in a generally upright, sitting position. Conventionally, the pilot is released from the ejection seat in response to a main canopy of the ejection seat's parachute assembly deploying. As the canopy catches wind, the pilot may be rotated to orient the pilot in the direction of canopy line stretch. As the pilot is rotated in-line with the force provided by the canopy, there is an increased risk of neck hyperextension and injury due to the change in angular momentum forcing the pilot's head rearward.

SUMMARY

A parachute assembly is disclosed herein. In accordance with various embodiments, the parachute assembly may comprise a canopy and a plurality of suspension lines coupled to the canopy. A left shoulder riser may be coupled to a first set of suspension lines of the plurality of suspension lines. A right shoulder riser may be coupled to a second set of suspension lines of the plurality of suspension lines. A head restraint may be located between the left shoulder riser and the right shoulder riser.

In various embodiments, the head restraint may comprise a first strap coupled to a first portion of the left shoulder riser and a first portion of the right shoulder riser, and a second strap coupled to a second portion of the left shoulder riser and a second portion of the right shoulder riser. The second portion of the left shoulder riser may be distal to the first set of suspension lines as compared to the first portion of the left shoulder riser. The second portion of the right shoulder riser may be distal to the second set of suspension lines as compared to the first portion of the right shoulder riser.

In various embodiments, a third strap may extend between the first strap and the second strap. A length of the third strap may be less than a distance between the first portion of the left shoulder riser and the second portion of the left shoulder riser.

In various embodiments, the head restraint may comprise a first strap coupled to a first portion of the left shoulder riser and a first portion of the right shoulder riser, and a second strap coupled to a second portion the left shoulder riser and a second portion of the right shoulder riser. The second portion of the left shoulder riser may be distal to the first set of suspension lines as compared to the first portion of the left shoulder riser. The first portion of the right shoulder riser may be distal to the second set of suspension lines as compared to the second portion of the right shoulder riser.

In various embodiments, the head restraint may comprise a central riser coupled to a third set of suspensions lines of the plurality of suspension lines. The head restraint may comprise a first rigid structure coupled to the left shoulder riser and configured to extend toward the right shoulder riser; and a second rigid structure coupled to the right shoulder riser and configured to extend toward the left shoulder riser.

In various embodiments, the head restraint may comprises a strap extending between the left shoulder riser and the right shoulder riser, and a rigid structure coupled to the strap. The rigid structure may be configured to rotate about the strap.

A parachute assembly for decelerating an occupant of an ejection seat, may comprise a first left shoulder riser, a first right shoulder riser, and a head restraint configured to be located between the first left shoulder riser and the first right shoulder riser upon deployment of the parachute assembly.

In various embodiments, a second left shoulder riser may be located forward of the first left shoulder riser, and a second right shoulder riser may be located forward of the first right shoulder riser. In various embodiments, the head restraint may comprise a first strap coupled to the first left shoulder riser and the first right shoulder riser, and a second strap generally parallel to the first strap and coupled to the first left shoulder riser and the first right shoulder riser.

In various embodiments, a third strap may extend between the first strap and the second strap. In various embodiments, the head restraint may comprise a first strap coupled to a first portion of the first left shoulder riser and to a first portion of the first right shoulder riser, and a second strap coupled to a second portion the first left shoulder riser and to a second portion of the first right shoulder riser. The second strap may be configured to overlap the first strap upon deployment of the parachute assembly.

In various embodiments, the head restraint may comprise a central riser located between the first left shoulder riser and the first right shoulder riser. In various embodiments, the head restraint may comprise a first rigid structure coupled to the first left shoulder riser, and a second rigid structure coupled to the first right shoulder riser. In various embodiments, the head restraint may comprise a strap extending between the first left shoulder riser and the first right shoulder riser, and a rigid structure coupled to the strap.

Also disclosed herein, in accordance with various embodiments, is a parachute assembly comprising a canopy, a first suspension line coupled to the canopy, a first riser coupled to the first suspension line, a second suspension line coupled to the canopy, a second riser coupled to the second suspension line, and a head restraint located between the first riser and the second riser.

In various embodiments, a reefing line may be configured to restrict an expansion of the canopy, and a third suspension line may be coupled to the reefing line. The head restraint may be coupled to the third suspension line.

In various embodiments, the head restraint may comprise at least one of a plurality of straps extending between the first riser and the second riser, a first rigid structure coupled to a strap extending between the first riser and the second riser, or a second rigid structure extending from the first riser.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
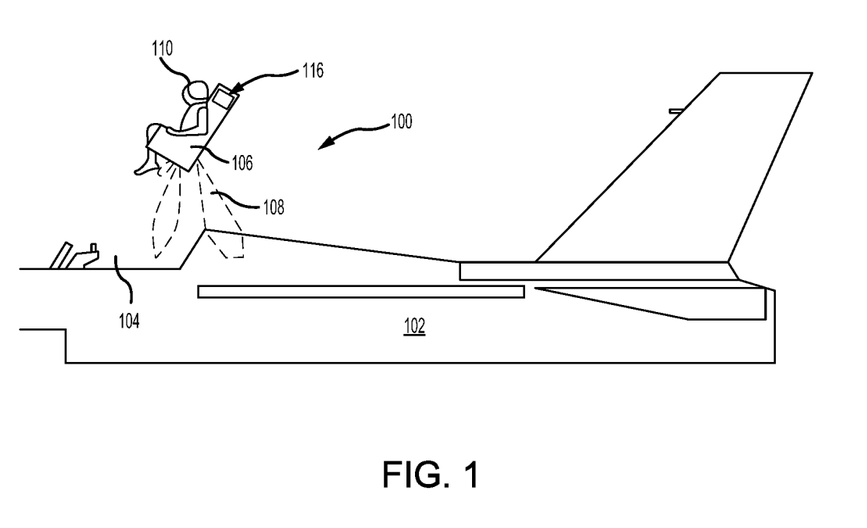
FIG. 1 illustrates an ejection seat being launched from an aircraft cockpit, in accordance with various embodiments.

In various embodiments, and with reference to FIG. 1, an aircraft ejection system 100 is shown, in accordance with various embodiments. Aircraft ejection system 100 may be installed in aircraft 102 to safely expel ejection seat 106 and an occupant 110 of ejection seat 106 from a cockpit 104 of aircraft 102. Ejection seat 106 may be urged from cockpit 104 by a propulsion system 108. Aircraft ejection system 100 may include a parachute assembly 116. In various embodiments, prior to deployment of parachute assembly 116, a portion of parachute assembly 116 may be stored within ejection seat 106.

Figure 2:
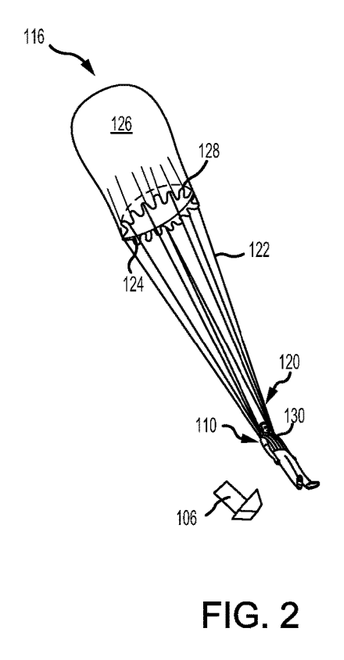
FIG. 2 illustrates a perspective view of a parachute assembly in a deployed state after separation of the occupant from the ejection seat, in accordance with various embodiments.

With reference to FIG. 2, parachute assembly 116 is illustrated in a deployed state, in accordance with various embodiments. Parachute assembly 116 may be used to increase a drag of, or otherwise decelerate, occupant 110, in response to occupant 110 being ejected, jumped, ditched, and/or dropped (collectively, "ejected") from an aircraft. Parachute assembly 116 may be configured to deploy upon separation of occupant 110 from ejection seat 106. Stated differently, in various embodiments, deployment of parachute assembly 116 may be configured to separate occupant 110 from ejection seat 106. Parachute assembly 116 may comprise a canopy 126, suspension lines 122, and risers 120.

Upon deployment of parachute assembly 116, canopy 126 may open to increase drag, or otherwise decelerate, occupant 110. Canopy 126 may comprise any suitable type of canopy and any suitable type of material, such as, for example, canvas, silk, nylon, aramid fiber (e.g., KEVLAR®), polyethylene terephthalate, and/or the like. Suspension lines 122 may be coupled to canopy 126 using any suitable attachment technique, such as, for example, through stitching. Suspension lines 122 may be configured to at least partially stabilize deployed canopy 126. In various embodiments, parachute assembly 116 may include one or more reefing line(s) 124. Reefing line 124 may be coupled to canopy 126 proximate a circumferential edge 128 of canopy 126. Reefing line 124 may also be coupled to suspension lines 122. Reefing line 124 is configured to restrict expansion of canopy 126 such that canopy 126 opens in stages. For example, reefing line 124 may be cut, or otherwise severed, at a preselected time after deployment of canopy 126. Prior to cutting reefing line 124, canopy 126 is held at a first, restricted diameter. After reefing line 124 is severed, canopy 126 is able to open further and its diameter increases. Opening canopy 126 in stages may reduce opening shock to parachute assembly 116. The time delay between deploying canopy 126 and severing reefing line 124 may comprise any suitable time delay based on properties of parachute assembly 116, the type of aircraft, and/or the load limitations of the object (e.g., occupant 110) being carried by parachute assembly 116.

In various embodiments, suspension lines 122 may be configured to connect canopy 126 to risers 120. Suspension lines 122 and risers 120 may comprise any suitable material. For example, suspension lines 122 may comprise a tubular braided material that constricts in diameter under tension, such as, for example, nylon, aramid fiber (e.g., KEVLAR®), and/or the like. Risers 120 may comprise a webbing formed from nylon, aramid fiber (e.g., KEVLAR®), and/or the like. Risers 120 may be configured to attach to a harness 130, or other structure, configured to secure occupant 110 to risers 120. In various embodiments, parachute assembly 116 may comprise a plurality of risers 120 attached to harness 130.

Figure 3:
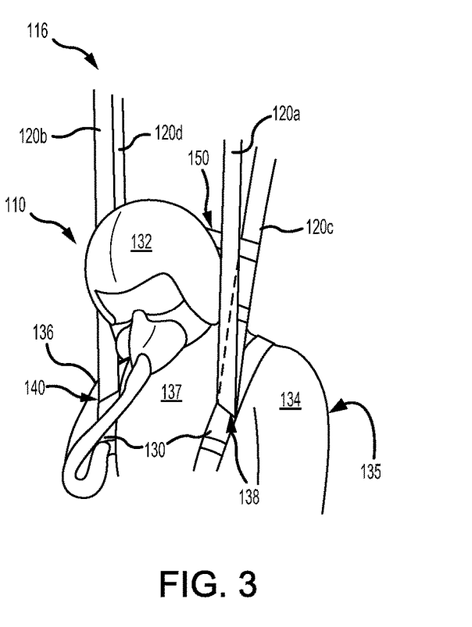
FIG. 3 illustrates a perspective view of a head restraint of a parachute assembly in a deployed state, in accordance with various embodiments.

With reference to FIG. 3, in various embodiments, parachute assembly 116 may comprise left shoulder risers 120*a* and 120*c*, and right shoulder risers 120*b* and 120*d*. Left shoulder risers 120*a* and 120*c* are attached proximate a left shoulder 134 of occupant 110 and/or are configured to be located over left shoulder 134 of occupant 110, upon deployment of parachute assembly 116. Right shoulder risers 120*b* and 120d are attached proximate a right shoulder 136 of occupant 110 and/or are configured to be located over right shoulder 136 of occupant 110, upon deployment of parachute assembly 116.

In various embodiments, left shoulder riser 120a is located forward of left shoulder riser 120c, and right shoulder riser 120b is located forward of right shoulder riser 120d. Stated differently, left shoulder riser 120c and right shoulder riser 120d may be located closer to a backside 135 of occupant 110 as compared, respectively, to left shoulder riser 120a and right shoulder riser 120b. As used herein, "forward" refers to the side of harness 130 configured to be attached to a front side of an occupant. Front side 137 of occupant 110 is generally opposite backside 135 of occupant 110.

In various embodiments, left shoulder risers 120a and 120c may be attached to harness 130 at an attachment location 138, and right shoulder risers 120b and 120d may be attached to harness 130 at an attachment location 140. Attachment locations 138 and 140 are on an end of risers 120 that is opposite suspension lines 122, with momentary reference to FIG. 2. Attachment locations 138 and 140 may comprise any suitable attachment mechanism (e.g., stitching, adhesive, etc.) for securing risers 120 to harness 130. In various embodiments, attachment locations 138 and 140 may each comprise a hoop, or ring, attached to harness 130 and located through a loop formed by risers 120. In various embodiments, each riser 120 (e.g., left shoulder riser 120a, right shoulder riser 120b, left shoulder riser 120c, and right shoulder riser 120d) may have its own attachment location on harness 130.

With combined reference to FIG. 2 and FIG. 3, in various embodiments, parachute assembly 116 may comprise a greater number of suspension lines 122 as compared to the number of risers 120. For example, each riser 120 may couple to multiple suspension lines 122, such as, for example 1 to 16 suspension lines 122 per riser 120, 8 to 16 suspension lines 122 per riser 120, etc. In this regard, left shoulder riser 120a, right shoulder riser 120b, left shoulder riser 120c, and right shoulder riser 120d may each couple to its own individual set of suspension lines 122.

As canopy 126 catches wind, occupant 110 may be rotated in-line with the direction of suspension line stretch. As occupant 110 is rotated, a rearward force may be exerted on the neck of occupant 110. As used herein, "rearward" refers to the side of harness 130 configured to be attached to a backside of an occupant supported by parachute assembly 116. In accordance with various embodiments, parachute assembly 116 may include a head restraint 150 (FIG. 3). Head restraint 150 is configured to be located rearward of the head 132 of occupant 110, upon deployment of parachute assembly 116. Head restraint 150 is configured to limit translation of head 132 in the rearward direction, thereby reducing a likelihood of head and/or neck injury to occupant 110.

Figure 4:
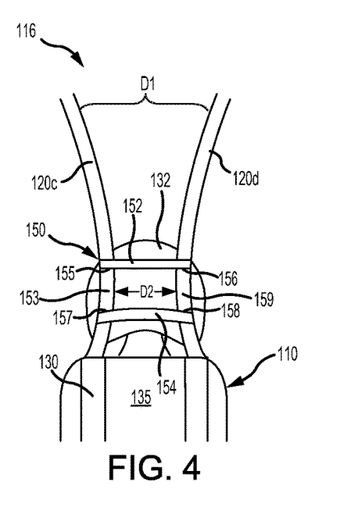
FIG. 4 illustrates a forward view of the head restraint of FIG. 3, in accordance with various embodiments.

Referring to FIG. 4, a forward view of head restraint 150 of parachute assembly 116 is illustrated, in accordance with various embodiments. Head restraint 150 includes one or more straps coupled to left shoulder riser 120c and right shoulder riser 120d. In various embodiments, head restraint 150 includes a first strap 152 and a second strap 154. First strap 152 may be coupled to a first portion 155 of left shoulder riser 120c and to a first portion 156 of right shoulder riser 120d. Second strap 154 may be coupled to a second portion 157 of left shoulder riser 120c and to a second portion 158 of right shoulder riser 120d. Second strap 154 is distal to suspension lines 122, with momentary reference to FIG. 2, as compared to first strap 152. Stated differently, second strap 154 is located closer to harness 130 as compared to first strap 152. In various embodiments, second strap 154 is generally parallel to first strap 152. As used in the present context only, "generally parallel" means±15° from parallel. First strap 192 and second strap 194 may comprise any suitable material, such as, for example, canvas, nylon webbing, aramid fiber (e.g., KEVLAR®), polyethylene terephthalate, and/or the like.

First and second straps 152, 154 may be coupled to left shoulder riser 120c and right shoulder riser 120d using any suitable attachment technique, such as, for example, through stitching, adhesive, friction coupling, etc. In various embodiments, first strap 152 may be looped around left shoulder riser 120c and right shoulder riser 120d such that a portion of left shoulder riser 120c is located through a first loop formed by first strap 152 and right shoulder riser 120d is located through a second loop formed by first strap 152. Second strap 154 may be looped around left shoulder riser 120c and right shoulder riser 120d in a similar manner. In various embodiments, first strap 152 and/or second strap 154 may be configured to pull left shoulder riser 120c and right shoulder riser 120d together, such that a distance D1 between left shoulder riser 120c and right shoulder riser 120d above first strap 152 (i.e., proximate to suspension lines 122, with momentary reference to FIG. 2) is greater than a distance D2 between the portion 153 of left shoulder riser 120c located between first strap 152 and second strap 154 and the portion 159 of right shoulder riser 120d located between first strap 152 and second strap 154. First and second straps 152, 154 are configured and attached to left shoulder riser 120c and right shoulder riser 120d such that, upon deployment of the parachute assembly 116, first and second straps 152, 154 will be located rearward of head 132 of occupant 110 and may thereby limit translation of head 132 in the rearward direction.

Figure 5A:
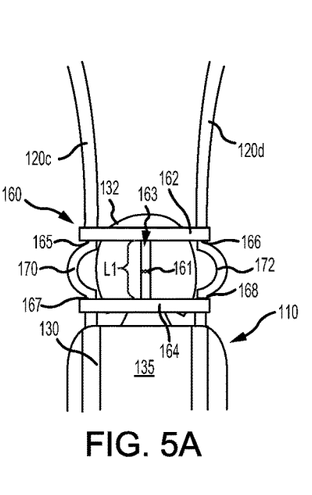
FIG. 5A illustrates a forward view of a head restraint having a releasable strap, in accordance with various embodiments.

With reference to FIG. 5A, a head restraint 160 of a parachute assembly is illustrated, in accordance with various embodiments. In various embodiments, head restraint 160 may replace head restraint 150 in parachute assembly 116, with momentary reference to FIG. 3. Head restraint 160 includes a first strap 162 and a second strap 164, which are each coupled to left shoulder riser 120c and right shoulder riser 120d. First strap 192 and second strap 194 may comprise any suitable material, such as, for example, canvas, nylon webbing, aramid fiber (e.g., KEVLAR®), polyethylene terephthalate, and/or the like. First strap 162 may be coupled to a first portion 165 of left shoulder riser 120c and to a first portion 166 of right shoulder riser 120d. Second strap 164 may be coupled to a second portion 167 of left shoulder riser 120c and to a second portion 168 of right shoulder riser 120d. First and second straps 162, 164 may be coupled to left shoulder riser 120c and right shoulder riser 120d using any suitable attachment technique, such as, for example, through stitching, adhesive, friction coupling, etc.

In various embodiments, head restraint 160 further includes a third strap (also referred to as a "releasable strap") 163 coupled between first strap 162 and second strap 164. Releasable strap 163 may be coupled to first and second straps 162, 164 using any suitable attachment technique, such as, for example, through stitching, adhesive, friction coupling, etc. Releasable strap 163 may comprise any suitable material, such as, for example, silicone, rubber, canvas, nylon webbing, aramid fiber (e.g., KEVLAR®), polyethylene terephthalate, and/or the like. In various embodiments, releasable strap 163 comprises an elastic material. In various embodiments, releasable strap 163 comprises a thread 161 securing a first portion 163a of releasable strap 163 to a second portion 163b of releasable strap 163.

Figure 5B:
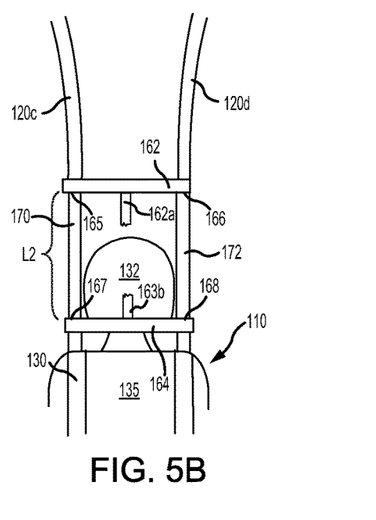
FIG. 5B illustrates a forward view of a head restraint having a releasable strap in a released position, in accordance with various embodiments.

With reference to FIG. 5B, head restraint 160 is illustrated with releasable strap 163 in a released, or "torn," position, in accordance with various embodiments. In various embodiments, releasable strap 163 may be configured to break, tear, or otherwise separate, into first portion 163a and second portion 163b in response to tension imparted on first and second straps 162, 164 by left shoulder riser 120c and right shoulder riser 120d. In various embodiments, thread 161 (FIG. 5A) may be configured to break under a desired amount of tension, thereby allowing first portion 163a to separate from second portion 163b.

In various embodiments, a length L1 (FIG. 5A) of releasable strap 163 and the attachment locations of first and second straps 162, 164 to left shoulder riser 120c and right shoulder riser 120d may be selected to create slack in a center portion 170 of left shoulder riser 120c located between first strap 162 and second strap 164 and in a center portion 172 of right shoulder riser 120d located between first strap 162 and second strap 164. In this regard, a length L2 of center portions 170 and 172 may be greater than length L1 (FIG. 5A) of releasable strap 163. Releasable strap 163 and/or thread 161 may be configured to break under any suitable and/or desired amount of tension, dependent upon the type of parachute assembly, weight and size of the object being carried, type of aircraft, and/or any other operational and/or conditional elements.

In various embodiments, releasable strap 163 may serve as a shock absorber. In various embodiments, after releasable strap 163 has separated, first strap may no longer be located rearward of head 132. Removing first strap 162 from behind head 132 may increase a range of motion of head 132. Head restraint 160 may thus limit rearward motion of head 132 during peak deployment forces to reduce possibility of neck hyperextension, while allowing occupant 110 to have increased head mobility during steady state decent and landing.

Figure 6:
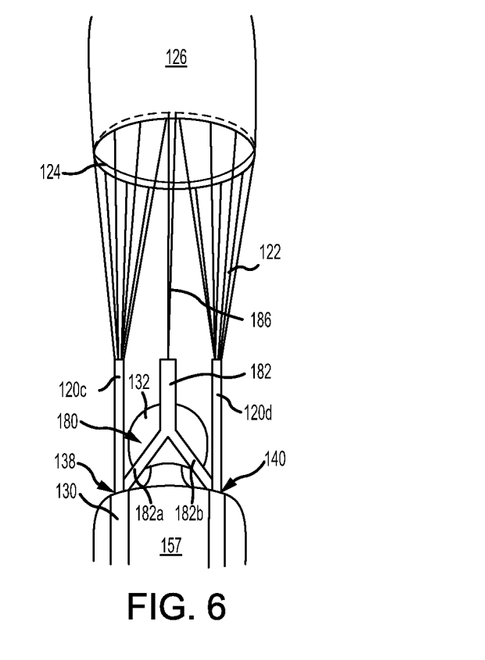
FIG. 6 illustrates a forward view of a head restraint configured as a central riser, in accordance with various embodiments.

With reference to FIG. 6, a head restraint 180 of a parachute assembly is illustrated, in accordance with various embodiments. In various embodiments, head restraint 180 may replace head restraint 150 in parachute assembly 116, with momentary reference to FIG. 3. Head restraint 180 may comprise a central riser 182 located between left shoulder riser 120c and right shoulder riser 120d. Central riser 182 may include a first portion 182a coupled to left shoulder riser 120c. In various embodiments, first portion 182a of central riser 182 may be attached to harness 130 at attachment location 138. First portion 182a may be coupled to left shoulder riser 120c and/or to attachment location 138 using any suitable attachment technique, for example, using stitching, adhesive, etc. Central riser 182 may further include a second portion 182b coupled to right shoulder riser 120d. In various embodiments, second portion 182b of central riser 182 may be attached to harness 130 at attachment location 140. Second portion 182b may be coupled to right shoulder riser 120d and/or to attachment location 140 using any suitable attachment technique, for example, using stitching, adhesive, etc. In various embodiments, central riser 182 may comprise canvas, nylon webbing, aramid fiber (e.g., KEVLAR®), and/or the like.

Central riser 182 is configured to be located rearward of and limit rearward translation of head 132, upon deployment of the parachute assembly. Central riser 182 is coupled to one or more suspension line(s) 186. In various embodiments, suspension line(s) 186 may be coupled to canopy 126. In various embodiments, suspension line(s) 186 may be coupled to reefing line 124. In this regard, severing reefing line 124 may release suspension lines 186 from canopy 126, thereby removing central riser 182 from behind head 132. Head restraint 180 comprising central riser 182 may thus limit rearward motion of head 132 during peak deployment forces to reduce possibility of neck hyperextension, while allowing occupant 110 to have increased head mobility during steady state decent and landing.

Figure 7:
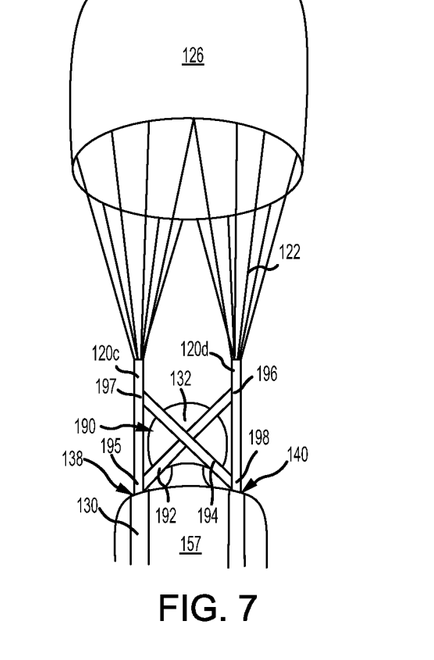
FIG. 7 illustrates a forward view of a head restraint having overlapping straps, in accordance with various embodiments.

With reference to FIG. 7, a head restraint 190 of a parachute assembly is illustrated, in accordance with various embodiments. In various embodiments, head restraint 190 may replace head restraint 150 in parachute assembly 116, with momentary reference to FIG. 3. Head restraint 190 includes one or more straps coupled to left shoulder riser 120c and right shoulder riser 120d. In various embodiments, head restraint 190 includes a first strap 192 and a second strap 194. First strap 192 and second strap 194 are each coupled to left shoulder riser 120c and right shoulder riser 120d. First and second straps 192, 194 may be coupled to right shoulder riser 120d and left shoulder riser using any suitable attachment technique, for example, using stitching, adhesive, etc. First strap 192 and second strap 194 may comprise any suitable material, such as, for example, canvas, nylon webbing, aramid fiber (e.g., KEVLAR®), polyethylene terephthalate, and/or the like.

First strap 192 may be coupled to a first portion 195 of left shoulder riser 120c and to a first portion 196 of right shoulder riser 120d. Second strap 194 may be coupled to a second portion 197 of left shoulder riser 120c and to a second portion 198 of right shoulder riser 120d. First portion 195 of left shoulder riser 120c and second portion 198 of right shoulder riser 120d are distal to suspension lines 122, as compared, respectively, to second portion 197 of left shoulder riser 120c and first portion 196 of right shoulder riser 120d. Stated differently, first portion 195 of left shoulder riser 120c and second portion 198 of right shoulder riser 120d are located closer to harness 130 as compared, respectively, to second portion 197 of left shoulder riser 120c and first portion 196 of right shoulder riser 120d. In various embodiments, first strap 192 may be coupled to harness 130 at attachment location 138 and to first portion 196 of right shoulder riser 120d, and second strap 194 may be coupled to harness 130 at attachment location 140 and to second portion 197 of left shoulder riser 120c.

In various embodiments, first strap 192 and second strap 194 may be configured in an "X," with second strap 194 overlapping first strap 192 behind head 132. Head restraint 190 comprising first and second straps 192, 194 may thus limit rearward motion of head 132 to reduce a possibility of neck hyperextension during deployment of the parachute assembly.

Figure 8:
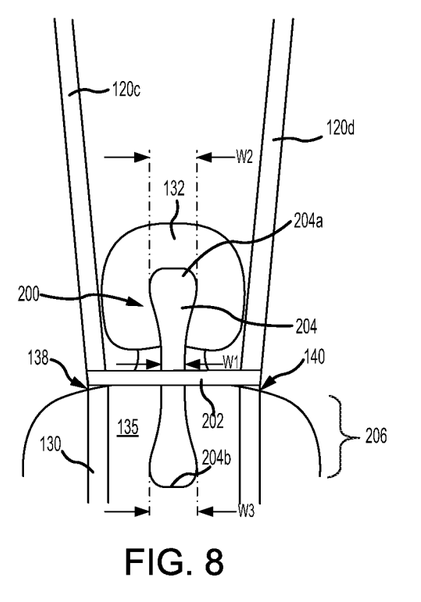
FIG. 8 illustrates a forward view of a head restraint having a rotatable rigid structure, in accordance with various embodiments.

With reference to FIG. 8, a head restraint 200 of a parachute assembly is illustrated, in accordance with various embodiments. In various embodiments, head restraint 200 may replace head restraint 150 in parachute assembly 116, with momentary reference to FIG. 3. Head restraint 200 includes a strap 202 coupled to left shoulder riser 120c and to right shoulder riser 120d. Strap 202 may be coupled to left shoulder riser 120c and to right shoulder riser 120d using any suitable attachment technique, for example, using stitching, adhesive, friction coupling, etc. Strap 202 may comprise any suitable material, such as, for example, canvas, nylon webbing, aramid fiber (e.g., KEVLAR®), polyethylene terephthalate, and/or the like.

Head restraint 200 further includes a rigid structure 204 coupled to strap 202.

Rigid structure 204 may comprise a polyvinyl chloride, polystyrene, wood, metal, ceramic, carbon fiber composite, fiberglass, or other rigid material. Rigid structure 204 is configured to extend from behind head 132 to an upper thoracic area 206 of occupant 110. For example, upon deployment of the parachute assembly, a first end 204a of rigid structure 204 may be located rearward of head 132 and a second end 204b of rigid structure 204 may be located rearward of upper thoracic area 206. Prior to deploying the parachute assembly, rigid structure 204 may be located between occupant 110 and ejection seat 106, with momentary reference to FIG. 1. In various embodiment, rigid structure 204 may be located behind a cushion of ejection seat 106, such that the cushion is located between occupant 110 and rigid structure 204. In various embodiments, rigid structure 204 may be configured to rotate about strap 202. For example, rigid structure 204 may be coupled to strap 202, such that first end 204a of rigid structure can pivot about strap 202 (e.g., toward and away from head 132).

In various embodiments, rigid structure 204 may comprise a "dog bone" or "hourglass" shape, wherein a width W1 of rigid structure 204 proximate strap 202 is less than a width W2 of rigid structure 204 proximate first end 204a and less than a width W3 of rigid structure 204 proximate second end 204b. Head restraint 200 comprising strap 202 and rigid structure 204 may limit rearward translation of head 132 to reduce a possibility of neck hyperextension during deployment of the parachute assembly.

Figure 9:
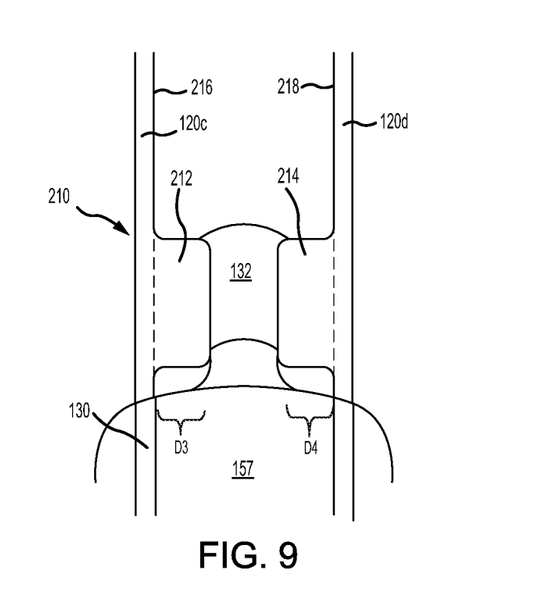
FIG. 9 illustrates a forward view of a head restraint having rigid structures extending from the risers, in accordance with various embodiments.

With reference to FIG. 9, a head restraint 210 of a parachute assembly is illustrated, in accordance with various embodiments. In various embodiments, head restraint 210 may replace head restraint 150 in parachute assembly 116, with momentary reference to FIG. 3. Head restraint 210 includes a first rigid structure 212 coupled to left shoulder riser 120c, and a second rigid structure 214 coupled to right shoulder riser 120d.

First and second rigid structures 212, 214 may comprise a polyvinyl chloride, polystyrene, wood, metal, ceramic, carbon fiber composite, fiberglass, or other rigid material. In various embodiments, first rigid structure 212 may be located within a fabric material (e.g., a canvas, nylon webbing, aramid fiber, polyethylene terephthalate, etc.) similar to the material of left shoulder riser 120c. Stated differently, the material of left shoulder riser 120c may surround first rigid structure 212. Stated yet another way, first rigid structure 212 may be sewn into the material of left shoulder riser 120c. In various embodiments, second rigid structure 214 may be located within a fabric material (e.g., a canvas, nylon webbing, aramid fiber, polyethylene terephthalate, etc.), similar to the material of right shoulder riser 120d. Stated differently, the material of right shoulder riser 120d may surround second rigid structure 214. Stated yet another way, second rigid structure 214 may be sewn into the material of right shoulder riser 120d.

First rigid structure 212 and second rigid structure 214 may be coupled, respectively, to left shoulder riser 120c and right shoulder riser 120d using any suitable attachment technique, for example, using stitching, adhesive, friction coupling, etc. In various embodiments, a portion of first rigid structure 212 may be looped around left shoulder riser 120c such that a portion of left shoulder riser 120c is located through a loop formed by first rigid structure 212. In various embodiments, a portion of second rigid structure 214 may be looped around right shoulder riser 120d such that a portion of right shoulder riser 120d is located through a loop formed by second rigid structure 214.

First rigid structure 212 is configured to extend from left shoulder riser 120c toward right shoulder riser 120d, upon deployment of the parachute assembly. Second rigid structure 214 is configured to extend from right shoulder riser 120d toward left shoulder riser 120c, upon deployment of the parachute assembly. First rigid structure 212 and second rigid structure 214 are configured such that, when the parachute assembly is in the deployed state, first rigid structure 212 and second rigid structure 214 will be located rearward of head 132. First rigid structure 212 extends a distance D3 from an internal edge 216 of left shoulder riser 120c toward right shoulder riser 120d. Second rigid structure 214 extends a distance D4 from an internal edge 218 of right shoulder riser 120d toward left shoulder riser 120c. When the parachute assembly is in the deployed state, internal edge 216 of left shoulder riser 120c is oriented toward internal edge 218 of right shoulder riser 120d. In accordance with various embodiments, distances D3 and D4 are selected such that, when the parachute assembly is in the deployed state, at least a portion of first rigid structure 212 and second rigid structure 214 will be located rearward of head 132. As canopy 126, with momentary reference to FIG. 2, inflates, a load (i.e., tension) is applied to suspension lines 122 and risers 120. Left shoulder riser 120c and right shoulder riser 120d tend to resist rotation when in tension, such that first and second rigid structures 212, 214 can limit rearward translation of head 132 and reduce a possibility of neck hyperextension during deployment of the parachute assembly.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A parachute assembly, comprising:
   a canopy;
   a plurality of suspension lines coupled to the canopy;
   a left shoulder riser coupled to a first set of suspension lines of the plurality of suspension lines;
   a right shoulder riser coupled to a second set of suspension lines of the plurality of suspension lines; and
   a head restraint located between the left shoulder riser and the right shoulder riser, the head restraint comprising:
      a first strap coupled to a first portion of the left shoulder riser and to a first portion of the right shoulder riser;
      a second strap coupled to a second portion of the left shoulder riser and to a second portion of the right shoulder riser, wherein the second portion of the left shoulder riser is distal to the first set of suspension lines as compared to the first portion of the left shoulder riser, and wherein the second portion of the right shoulder riser is distal to the second set of suspension lines as compared to the first portion of the right shoulder riser; and
      a third strap extending between the first strap and the second strap, wherein a length of the third strap is less than a length of a center portion of the left shoulder riser, the center portion of the left shoulder rise extending from the first portion of the left shoulder riser to the second portion of the left shoulder riser.

2. The parachute assembly of claim 1, wherein the third strap is configured to separate in response to translation of the first strap away from the second strap.

3. The parachute assembly of claim 1, wherein the third strap comprises a thread securing a first portion of the central riser coupled to a third strap to a second portion of the third strap.

4. The parachute assembly of claim 1, wherein the third strap comprises a first portion releasably coupled to a second portion of the third strap.

5. The parachute assembly of claim 4, wherein the first portion of the third strap is coupled to the first strap and the second portion of the third strap is coupled to the second strap.

6. A parachute assembly for decelerating an occupant of an ejection seat, comprising:
   a first left shoulder riser;
   a first right shoulder riser; and
   a head restraint configured to be located between the first left shoulder riser and first right shoulder riser upon deployment of the parachute assembly, the head restraint comprising a central riser located between the first left shoulder riser and the first right shoulder riser.

7. The parachute assembly of claim 6, further comprising:
   a second left shoulder riser located forward of the first left shoulder riser; and
   a second right shoulder riser located forward of the first right shoulder riser.

8. The parachute assembly of claim 6, wherein the head restraint comprises:
   a first portion coupled to the first left shoulder riser; and
   a second portion coupled to the first right shoulder riser.

9. The parachute assembly of claim 6, further comprising:
   a canopy; and
   a reefing line configured to restrict an expansion of the canopy; wherein the central riser is coupled to the reefing line.

10. The parachute assembly of claim 7, further comprising:
    a first set of suspension lines coupled to the first left shoulder riser;
    a second set of suspension lines coupled to the first right shoulder riser; and
    a third set of suspension lines coupled to the central riser.

11. A parachute assembly, comprising:
    a canopy;
    a first suspension line coupled to the canopy;
    a first riser coupled to the first suspension line;
    a second suspension line coupled to the canopy;
    a second riser coupled to the second suspension line;
    a head restraint located between the first riser and the second riser;
    a reefing line configured to restrict an expansion of the canopy; and
    a third suspension line coupled to the reefing line, wherein the head restraint is coupled to the third suspension line.

12. The parachute assembly of claim 11, wherein the head restraint comprises a strap extending between the first riser and the second riser.

* * * * *

UNITED STATES PATENT AND TRADEMARK OFFICE
CERTIFICATE OF CORRECTION

PATENT NO. : 11,027,851 B2  
APPLICATION NO. : 16/138014  
DATED : June 8, 2021  
INVENTOR(S) : Jaro S. Volny Page 1 of 1

It is certified that error appears in the above-identified patent and that said Letters Patent is hereby corrected as shown below:

In the Claims

Column 11, Lines 51-52, in Claim 3, please delete "cental riser coupled to a"

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*